RADIO DIRECTION FINDERS

Filed July 3, 1950 2 Sheets-Sheet 1

INVENTORS
DAVID JOHN FEWINGS,
LEONARD WILLIAM WHITAKER,
BY Baldwin & Wight
ATTORNEY Inventors:
David John Fewings +
Leonard William Whitaker
By their attorneys,
Baldwin + Wight United States Patent Office 2,728,910

Patented Dec. 27, 1955

2,728,910

RADIO DIRECTION FINDERS

David John Fewings, Chelmsford, and Leonard William Whitaker, Enfield, England, assignor to Marconi's Wireless Telegraph Company Limited, London, England, a company of Great Britain Application July 3, 1950, Serial No. 171,992

Claims priority, application Great Britain July 26, 1949

6 Claims. (Cl. 343—113)

This invention relates to radio direction finders and more particularly to radio direction finders of the kind in which an incoming signal direction is translated into two direct current potential differences whose values are respectively related to the sine and cosine of the angle between said direction and a datum direction.

One of the objects of our invention is to provide a cathode ray tube indicator arrangement for a radio direction finder in which the direction of the incoming signal is displayed on the cathode ray tube screen by a radial luminous line.

Another object of our invention is to provide an electronic switching system for the circuits of an indicator arrangement in a radio direction finder system.

Figure 1:
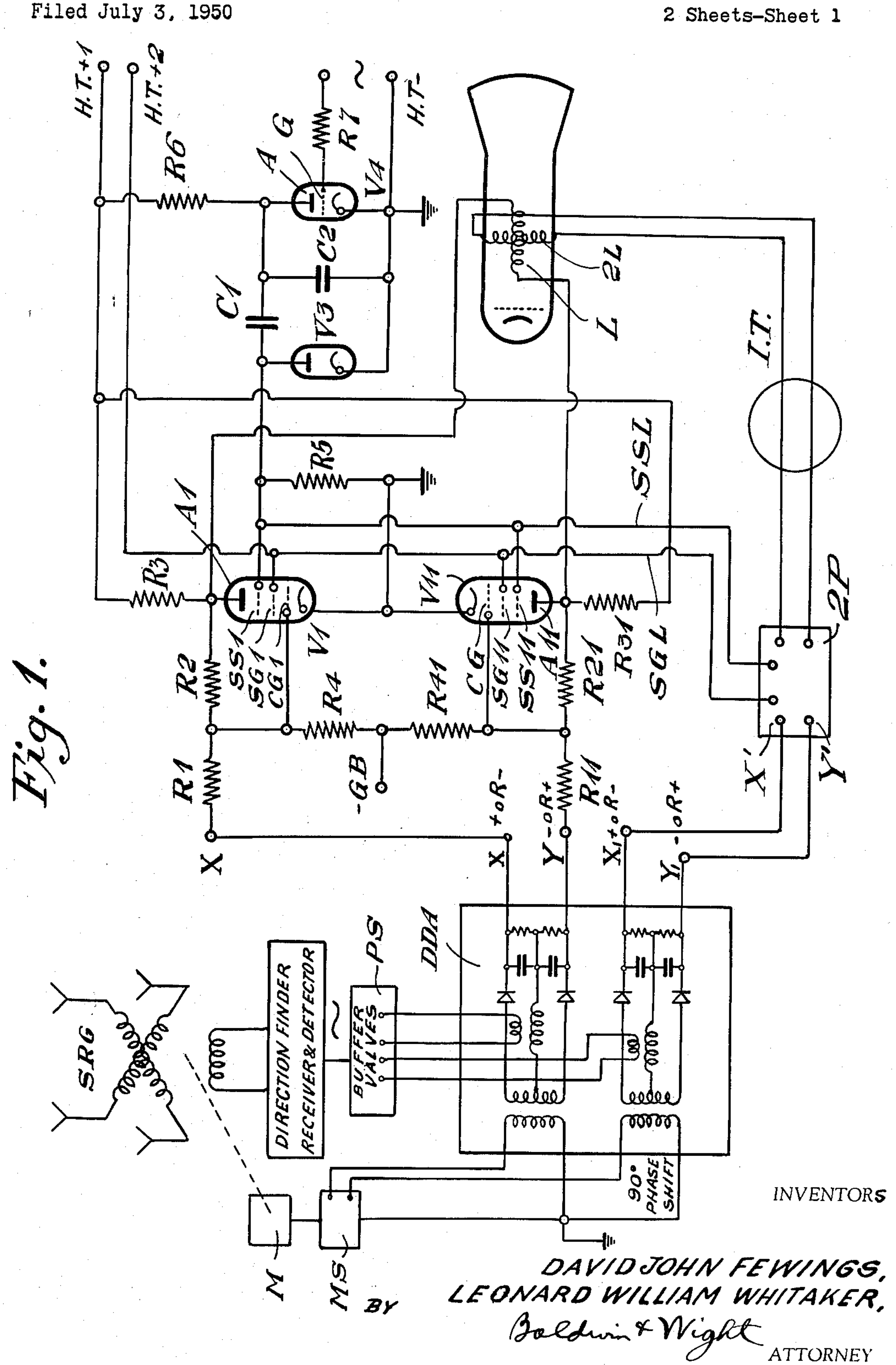
Figure 1A:
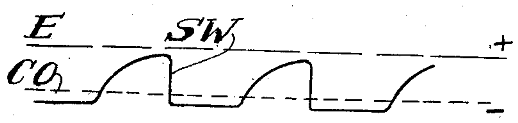
Figures 2, 2A:
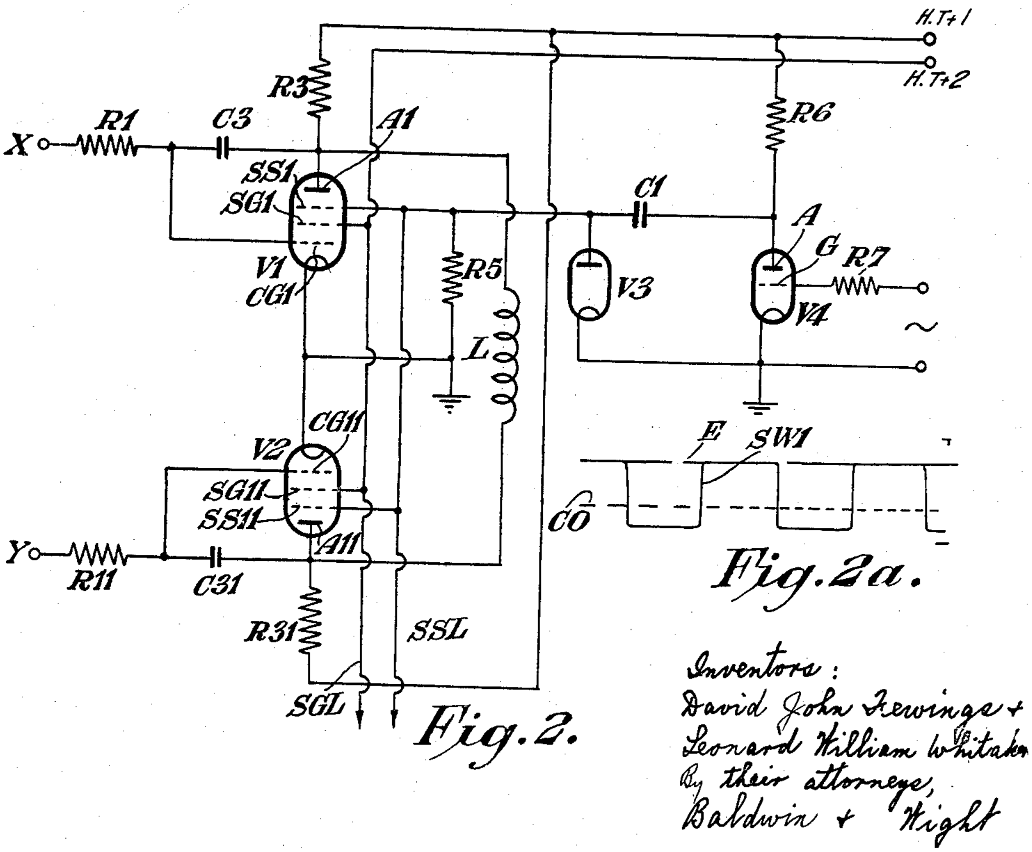

Our invention is set forth in detail in the specification hereinafter following by reference to the accompanying drawings, in which:

Fig. 1 shows the application of the circuit of our invention to a radio direction finder system;

Fig. 1*a* is a curve diagram explaining the theory of operation of the circuit of Fig. 1;

Fig. 2 shows a circuit for a modified form of radio direction finder system embodying our invention; and Fig. 2*a* is a curve diagram illustrating the theory of operation of the circuit of Fig. 2.

Radio direction finders of this type are well known and one example is illustrated at the left hand part of Fig. 1 of the accompanying drawing. Here there is employed a spinning radio goniometer SRG driven by a motor M and a so-called "magslip" MS. The phase of a periodic sine wave (in normal practice a 25 c./s. wave) derived from the goniometer, which is set up to produce a cardioid polar reception diagram in conjunction with a vertical aerial, is compared with the phases of two quadrature sine waves as derived from the magslips MS. This phase comparison is effected by two differential detector circuits in a differential detector assembly DDA. The rectified outputs of this assembly consist of two pairs of D. C. voltages as shown at XY and $X_1Y_1$, the polarities of these voltages being dependent upon the quadrant in which the incoming signal direction lies and their relative values upon the actual bearing angle in that quadrant, one pair of voltages being related to the sine and the other to the cosine of this angle.

The apparatus as so far described is known and one example of its use is described in the "Journal of the Institution of Electrical Engineers," volume 94, dated 1947, part 3*a*, page 786, entitled "Radio Communication Convention." Consequently, this part of the arrangement is conventional and does not form part of this invention.

In a radio direction finder of the kind referred to, for example, in a radio direction finder as briefly described above, the usual way of displaying the incoming signal direction is by means of a cathode ray tube for if, in the above described apparatus, the four D. C. voltages obtained are suitably applied to the four deflector plates of an electrostatically deflected tube, the spot of light on the screen of the tube will take up a position whose direction in relation to the center of the tube directly represents the incoming signal direction.

The present invention seeks to provide an improved cathode ray tube indicator or display arrangement in a direction finder of the kind referred to, the improvement residing in providing a display which is not in the form of a mere spot whose angular position in relation to a given point in the screen indicates the incoming signal direction but is in the form of a radial line whose direction from said point (in practice the center of the screen, or approximately the center) indicates the incoming signal direction. As will be readily appreciated such a radial line indication is much more convenient than, and constitutes a substantial practical improvement over, indication by a spot.

According to this invention the derived D. C. potential differences, respectively relates to the sine and cosine of the incoming signal direction in a direction finder of the kind referred to are respectively applied to the mutually perpendicular deflection systems of a cathode ray tube through thermionic valve circuits the valves in which are periodically and simultaneously reduced in conductivity so that the potential differences actually applied to said deflection systems are periodically reduced together in such manner as to transform what would otherwise be a spot on the tube screen into a radial line.

Preferably the valves are periodically cut off so that the radial line, whatever its direction may be, extends inwards to a center which is common to all such radial lines.

In the preferred embodiments of the invention each of the two direct current potential differences is applied between the control grids of a different pair of push-pull connected valves and one or other of the two mutually perpendicular deflecting systems of the tube is connected between the output electrodes of one or other of said pairs of valves all said valves being periodically and simultaneously cut off by applying a periodic voltage wave form in parallel to additional grids provided in said valves. The periodic wave form may be generated by a circuit comprising a switching valve which is periodically cut off by any convenient periodic voltage source, that is, by voltage from a mains supply. This periodic wave form may be saw tooth, or, preferably, rectangular. In the former case the switching valve controls the charging and discharging of a condenser to produce the saw tooth wave and the push-pull valves are arranged as repeaters with negative feedback from anode to grid. In the latter case the input circuits of the push-pull valves are arranged as so-called Miller integrator circuits.

Referring once more to Fig. 1 two of the derived D. C. voltages constituting one pair are applied at X and Y respectively through resistances R1, R11 to the control grids CG1, CG11 of a pair of pentodes V1, V11 whose cathodes are connected together and to earth. The control grid circuits are completed through resistances R4, R41 to the negative terminal —GB of a source (not shown) of bias potential. The screen grids SG1, SG11 are connected to a suitable point of positive potential at HT2 and the anodes A1, A11 which receive anode potential from HT1 through resistances R3, R31 are connected back to the respective control grids through resistances R2, R21. A coil L, which represents one of the two mutually perpendicular deflecting coil systems of an electromagnetically deflected cathode ray tube, is directly connected between the two anodes. The resistances R1, R2 which are included in a negative feed back path between the anode and control grid of valve V1 are preferably about equal and several times greater than R3. Similarly the corresponding resistances R11, R21 are about equal and several times greater than R31. Resistance R4 is preferably several times greater than R1 or R2 and similarly resistance R41 is several times greater than R11 or R21. The whole circuit, as so far described, is symmetrical about earth.

Ignore for the moment the remainder of the circuit and assume the suppressor grids SS1 and SS11 to be at earth potential. The negative feed back circuits for the valves assure that each has a low output impedance with a voltage gain between anode and input terminal (X or Y as the case may be) of about unity. The whole arrangement (including the value of the bias at —GB) is such that voltage changes at each anode A1 or A11 are linearly related to those at the associated input terminal X or Y (the phase reversal produced in each valve is of no importance) and accordingly the current through the coil system L which depends on the difference between the potentials at the anodes A1, A11, will be linearly related to the potential difference between X and Y.

The remainder of the circuit of Fig. 1 is for periodically cutting off the valves together. This remainder comprises a valve V4 which receives anode potential from HT1 through a resistance R6 and to whose grid G is applied a sinusoidal voltage wave from a 50 c./s. mains or other suitable supply through a current limiting resistance R7. The cathode of V4 is earthed and its anode A is connected to the suppressor grids SS1, SS11, through a condenser C1. A condenser C2 is connected between anode and cathode of valve V4 and a diode V3 or other rectifier, connected in the sense shown, and in parallel with a resistance R5, is between the two suppressor grids and earth. The voltage wave applied to grid G is large enough to switch the valve V4 on and off in successive half-cycles and accordingly the condenser C2 charges and discharges. The circuit constants are such that this gives a voltage wave as represented at SW in Fig. 1*a* which is applied through condenser C1 to the suppressor grids of the valves V1, V11, the D. C. level being set by the diode V3. In Fig. 1*a* the upper dash line E represents earth potential and the broken line C0 represents the suppressor grid voltage required to cut off valves V1, V11. Accordingly these valves are cut off periodically and the required periodic collapse of the current through L is obtained.

The potential difference between points XY, passed to the valves V1, V11 to feed the coil L gives, of course, only one co-ordinate deflection in the indicator tube indicated by a circle I. T. The other co-ordinate is obtained by feeding the second pair of D. C. voltages to the input terminals $X^1$ $Y^1$ (corresponding to X and Y) of a second pair of valves connected and arranged exactly like the valves V1, V11 and feeding the other coil system 2L of the tube in a similar way. The same valve switching circuit (including valve V4) is used to cut off this second pair of valves, this being indicated in the figure by the lead SSL which connects to the suppressor grids of said second pair. The lead SGL connects to the screen grids of said second pair of valves which are, however, not themselves shown, they and their circuits being represented by the block 2P.

The circuit of Fig. 1 requires that the pentodes shall have reasonably similar suppressor grid circuits and be otherwise generally similar for if they are not the indicator line produced in the tube will be curved instead of straight. Any need for careful matching of valves can however be avoided by using the modification of Fig. 2, which differs from Fig. 1 in the substitution of the condensers C3, C31 for the resistances R2, R21, the omission of the resistances R4, R41 and the bias connection at —GB and the omission of the condenser C2. Only such parts are shown in Fig. 2 as are necessary to illustrate the differences from Fig. 1. The switching wave obtained is, as shown at SW1 in Fig. 2*a*, rectangular instead of saw tooth as in Fig. 1*a*, for the condenser C2 of Fig. 1 is omitted. Accordingly the suppressor grids of the pentodes in Fig. 2 return almost instantaneously to earth potential, instead of exponentially as in Fig. 1 and remain there for a half period of the switching frequency. As will be seen, in each side of the push-pull circuit the anode is directly connected to the control grid by a condenser C3 or C31. The whole arrangement is such that the absolute potential of point X (or Y) is always positive to earth its minimum value being many times the grid base of the appropriate valve V1 (or V11). The term "grid base" as used herein refers to the range of grid potential extending from the point at which anode current is cut off to that at which grid current commences to flow. Variations in incoming signal direction make the points X and Y variably positive and negative, respectively to a positive datum potential. Accordingly the current through R1 or R11 will be independent of time and be dependent only on the applied input voltage and the value of R1 or R11. If, therefore, the condensers C3 or C31 having been fully charged to HT potential when the valves are cut off, the suppressor grids are returned instantaneously to earth potential, the valves pass anode current and currents flow into said condensers reducing the anode potentials at a rate inversely proportional to the products R1, C3 and R11, C31, i. e. at constant rates. Thus, if no limiting actions occur in the valves V1 and V11, the potential difference between the anodes A1, A11 will always be proportional to the voltage difference between X and Y even if the valves V1, V11 are not matched and accordingly a radial line indication will be given. Further, since the fall of the potentials at A1 and A11 is linearly related to time, the difference between these anode potentials is also linearly related to time and accordingly the rate of deflection which transforms the spot into a line will be constant and the line will therefore be of uniform and constant brightness—a desirable result.

We claim:

1. A cathode ray tube indicator arrangement for a radio direction finder, comprising, a cathode ray tube arrangement for a radio direction finder, comprising, a cathode ray tube, mutually perpendicular deflection systems for the cathode ray in said tube, a pair of push-pull connected valves including input and output circuits and including control grids in said input circuit, and anodes in said output circuits, said cathode ray tube having one of said deflection systems connected between the output circuits thereof, means for applying a derived D. C. potential proportional to the sine of the angle between the direction of an incoming signal and a datum direction, between the control grids of said pair of valves, a second pair of push-pull connected valves including input and output circuits and including control grids and anodes therein and having the other of said deflection systems connected between the output circuits thereof, means for applying a derived D. C. potential proportional to the cosine of said angle between the control grids of said second pair of valves, a source of periodic voltage wave form, a switching valve, means for applying said wave form to said switching valve to vary the conductivity thereof in synchronism with said wave form, and means connecting said switching valve to all said push-pull connected valves simultaneously and periodically to cut off the same in synchronism with said wave form.

2. An indicator arrangement as set forth in claim 1 and including a condenser, a charging and discharging circuit for said condenser controlled by said switching valve, and means for applying the periodic voltage wave form to the control grid of said switching valve to switch said valve on and off in successive half cycles of said wave form whereby a saw tooth wave form is produced from the charging and discharging of said condenser.

3. An indicator arrangement as set forth in claim 1 wherein the push-pull valves are connected as repeaters with negative feedback from anodes to control grids.

4. An indicator arrangement as set forth in claim 1 wherein the periodic wave form is applied to the control grid of said switching valve to switch the said valve on and off in successive half waves of said wave form said valve having a condenser in series with a rectifier connected between the anode and cathode thereof, said condenser being connected between said anode on the one hand and the anode of said rectifier and a grid of each of said push-pull valves on the other to cut off the same in synchronism with said wave form.

5. An indicator arrangement as set forth in claim 1 wherein the periodic wave form is applied to the control grid of said switching valve to switch said valve on and off in successive half cycles of said wave form and the push-pull valves are connected to produce a saw tooth voltage wave in synchronism with said voltage wave form and the push-pull valves are connected as repeaters with negative feedback from another to control grids.

6. An indicator arrangement as set forth in claim 1 in which said push-pull connected valves also include suppressor grids, and means for periodically impressing earth potential on said suppressor grids for substantially one-half the period of the switching frequency.

References Cited in the file of this patent

UNITED STATES PATENTS

| | | |
|---|---|---|
| 2,263,377 | Busignies et al. | Nov. 18, 1941 |
| 2,388,262 | Ganiayre et al. | Nov. 6, 1945 |
| 2,400,641 | Hardy | May 21, 1946 |
| 2,406,858 | Shepherd et al. | Sept. 3, 1946 |
| 2,427,905 | Fyler | Sept. 23, 1947 |